United States Patent
Loth et al.

Patent Number: 5,239,959
Date of Patent: Aug. 31, 1993

[54] ISOLATED COMBUSTION AND DILUTED EXPANSION (ICADE) PISTON ENGINE

[76] Inventors: John L. Loth, 689 Westview Ave., Morgantown, W. Va. 26506; Eric Loth, 8 Canterbury Ct., Champaign, Ill. 61821; Francis Loth, 459 Lynch Ave., Atlanta, Ga. 30318

[21] Appl. No.: 901,539

[22] Filed: Jun. 22, 1992

[51] Int. Cl.⁵ .................... F02B 19/02; F02B 19/04
[52] U.S. Cl. .................... 123/269; 123/289; 123/292
[58] Field of Search ............... 123/255, 262, 269, 289, 123/292; 60/39.6, 39.62

[56] References Cited

U.S. PATENT DOCUMENTS

| | | | |
|---|---|---|---|
| 1,758,686 | 5/1930 | Bullington | 123/262 X |
| 1,816,432 | 7/1931 | Hill | 123/262 |
| 1,849,347 | 3/1932 | Dale | 123/292 X |
| 2,256,776 | 9/1941 | Kammer | 123/269 X |
| 3,651,638 | 3/1972 | Goodacre | 60/39.6 |
| 3,809,030 | 5/1974 | Moiroux | 123/292 X |
| 3,911,874 | 10/1975 | Vincent | 123/274 |
| 4,372,264 | 2/1983 | Trucco | 123/292 X |
| 4,429,669 | 2/1984 | Burley | 123/292 X |
| 5,054,443 | 10/1991 | Kawamura | 123/292 X |

FOREIGN PATENT DOCUMENTS

| | | | |
|---|---|---|---|
| 2530837 | 1/1977 | Fed. Rep. of Germany | 123/292 |
| 128916 | 7/1984 | Japan | 123/292 |
| 1380941 | 1/1975 | United Kingdom | 123/292 |

Primary Examiner—Tony M. Argenbright

[57] ABSTRACT

The "Isolated Combustion and Dilution Expansion (ICADE) Engine", is a piston/cylinder arrangement used primarily for the compression of air and the expansion of diluted hot combustion products. Fuel injection and rapid combustion take place inside a separate combustion chamber, using a near stoichiometric mixture. The combustion pressurization provides the pressure needed to accelerate the combustion products tangentially into the donut shaped cavity formed by the piston/cylinder clearance. There they establish a vortex which enhances rapid mixing, rapid cooling to quench $NO_x$ forming reactions and to temporarily store the kinetic energy of the combustion products to limit the combustion pressure peak acting on the piston surface. The tangential entry also permits detonation combustion without normal shock reflections on the piston surface, thus preventing "knock". Only during the compression stroke, is the combustion chamber isolated from the piston/cylinder arrangement, by a valve with "controlled leakage". During the compression stroke, this "leaky valve" keeps the combustion chamber pressure lower than the pressure inside the cylinder. This controlled pressure difference serves to: prevent fuel from escaping into the cylinder, produce good fuel mixing with combustion air, permits the use of low octane fuel at moderate compression ratio inside the combustor, while the cylinder operates at high compression ratio for high thermal efficiency. Power level control is obtained by modulating the "leaky valve" to regulate the supply of combustion air, fuel flow control is separate. This configuration eliminates the need for a cylinder intake throttle valve.

7 Claims, 3 Drawing Sheets

ISOLATED COMBUSTION AND DILUTED EXPANSION (ICADE) PISTON ENGINE

1. FIELD OF THE INVENTION

The present invention relates to an improvement in thermal efficiency, and exhaust pollution of an internal combustion piston engine. More specifically the invention separates the combustion process from the cylinder by means of an isolation valve. The high temperature exhaust products are admitted into the cylinder where they mix with compressed air to form a reduced temperature mixture prior to piston expansion. This invention not only permits operation at a very lean overall mixture, but also allows high compression ratios without engine "knock".

2. PRIOR ART

Many patents have been filed on techniques to enhance the lean burning ability of internal combustion piston engines. They are listed under stratified charge engines. Although an ideal spark ignition engine has a thermal efficiency which is only a function of compression ratio and not of combustion temperature, in practice it is found that combustion efficiency improves when burning lean mixtures, if combustion is fast and completed prior to piston expansion. Unfortunately lean mixture burn slower than stoichiometric mixtures, which results in heat addition during piston expansion with loss in combustion compression and thus thermal efficiency. The slow burning problem lowers the efficiency of a conventional natural gas engine at high RPM. An example of a solution to the lean burning problem is the recent modification of the Mitsubishi engine, each cylinder has two intake ports and one exhaust port. One of the two intake ports conducts only air while the other conducts a richer air/fuel mixture. The spark plug is closer to the air/fuel intake than to the air only intake. Ignition starts at the side were the mixture is richer and spreads rapidly and evenly throughout the chamber.

3. SUMMARY OF THE INVENTION

The "Isolated Combustion and Dilution Expansion (ICADE) Engine", is a piston/cylinder arrangement used primarily for the compression of air and the expansion of diluted hot combustion products. Fuel injection and combustion takes place inside a separate combustion chamber. The combustion compression provides the pressure needed to inject the combustion products tangentially into the donut shaped cavity formed by the piston/cylinder clearance. There they establish a vortex which enhances rapid mixing, rapid cooling to quench $NO_x$ forming reactions and to temporarily store the kinetic energy of the combustion products to limit the combustion pressure peak acting on the piston surface.

Only during the compression stroke, is the combustion chamber isolated from the piston/cylinder arrangement, by a valve with "controlled leakage". During the compression stroke, this "leaky valve" prevents the combustion chamber pressure from rising as high as the pressure inside the cylinder. Installing and controlling air flow in such a "leaky valve" is easier than using a valve which seals hot combustion products as specified in some of the referenced patents. The controlled pressure difference provided by the "leaky valve" serves several purposes.

a) It prevents fuel injected inside the combustion chamber from leaking into the piston/cylinder arrangement
b) It allows combustion air to enter in the form of a high turbulent jet to produce good mixing with the fuel.
c) It allows use of a rapid burning near-stoichiometric combustible mixture, while the overall air/fuel mixture ratio can be below the lean flammability limit.
d) It permits the use of a low octane fuel at a moderate compression ratio inside the combustion chamber, while using high compression ratio inside the cylinder, to maintain high thermal efficiency.
e) It can replace the engine throttle valve as it controls the amount of combustion air admitted and thus the engine power level, without need to reduce the cylinder compression ratio and thus thermal efficiency.

This engine is especially suited for slow burning alternate fuel, such as natural gas, as it permits fuel injection throughout the compression stroke and good mixing with the turbulent combustion air jet. The tangential injection of the combustion products and associated vortex provides rapid mixing and quenching so as to halt $NO_x$ forming reactions, prior to piston expansion. The resulting lean mixture permits after burning of any remaining unburned hydrocarbons.

The tangential cylinder injection permits the application of detonation combustion for faster burning and higher combustion compression. The detonation shock wave enters parallel to the piston surface thereby preventing normal shock wave reflection with its associated "knock". The detonation generated kinetic energy is only available for a few micro-seconds and should be lost unless it is stored as vortex kinetic energy, such as is done in the ICADE engine. Some of this kinetic energy is recovered in the form of pressure during expansion.

The ICADE engine is the only one of its kind capable of efficiently harnessing shaft power from a detonation combustion. The herein described improvement in internal combustion engines is applicable to both spark ignition as well as compression ignition engines of either two or four cycle types. It promotes rapid combustion and the "leaky valve" is able to provide power control without need to throttle the cylinder intake air. The "leaky valve" permits operation at a cylinder compression ratio well above that allowable inside the combustion chamber to avoid pre-ignition. This means performance at high thermal efficiency at all power levels. Separating the combustion process from the cylinder allows operating with an overall fuel/air mixture ratio well below the lean flammability limit.

DESCRIPTION OF THE PREFERRED EMBODIMENTS

Figure 1:
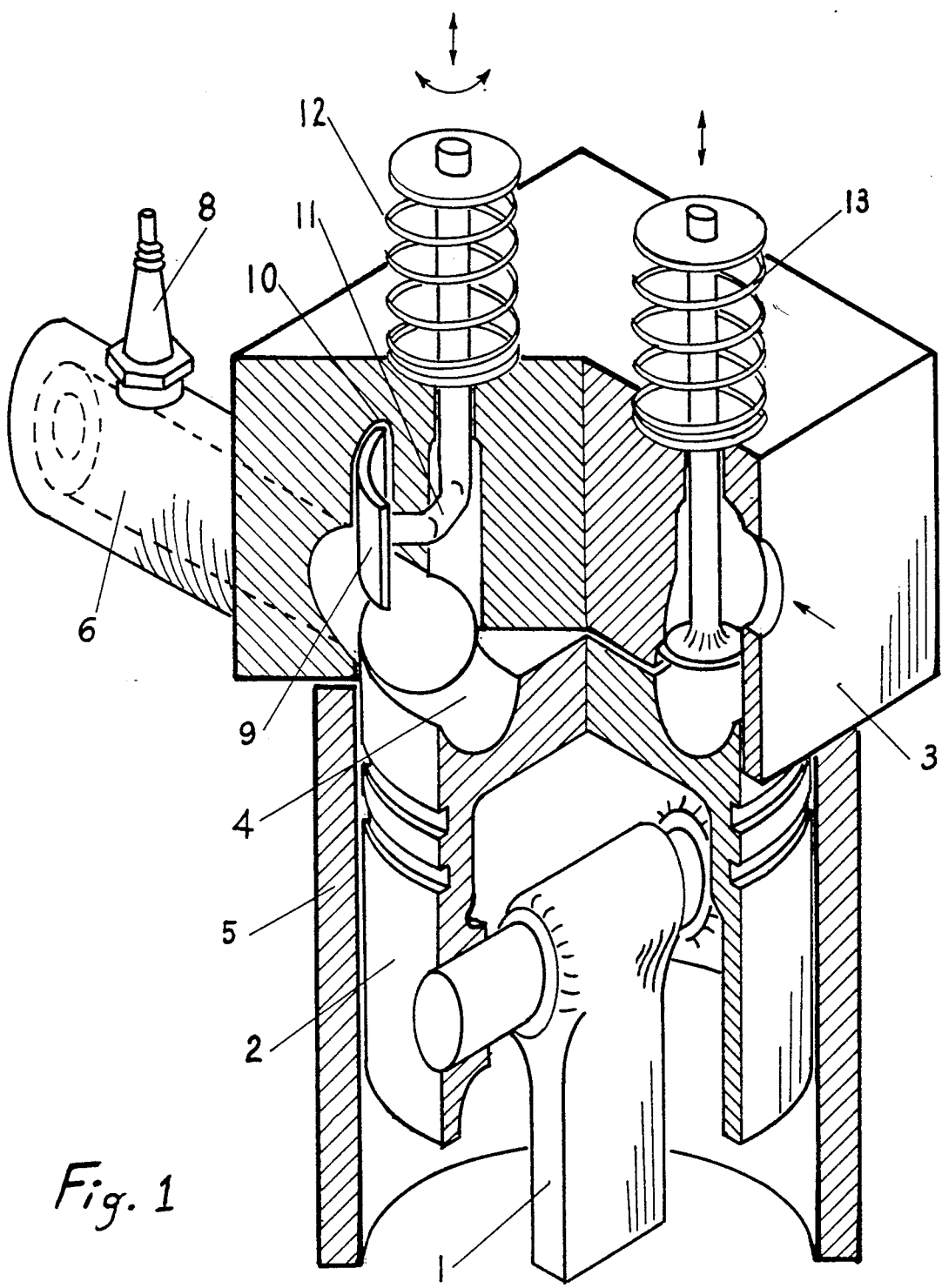
FIG. 1 is a cross-section of the ICADE Piston Engine. It shows the donut shaped cavity formed by the piston/cylinder head in which the vortex is formed.
Figure 2:
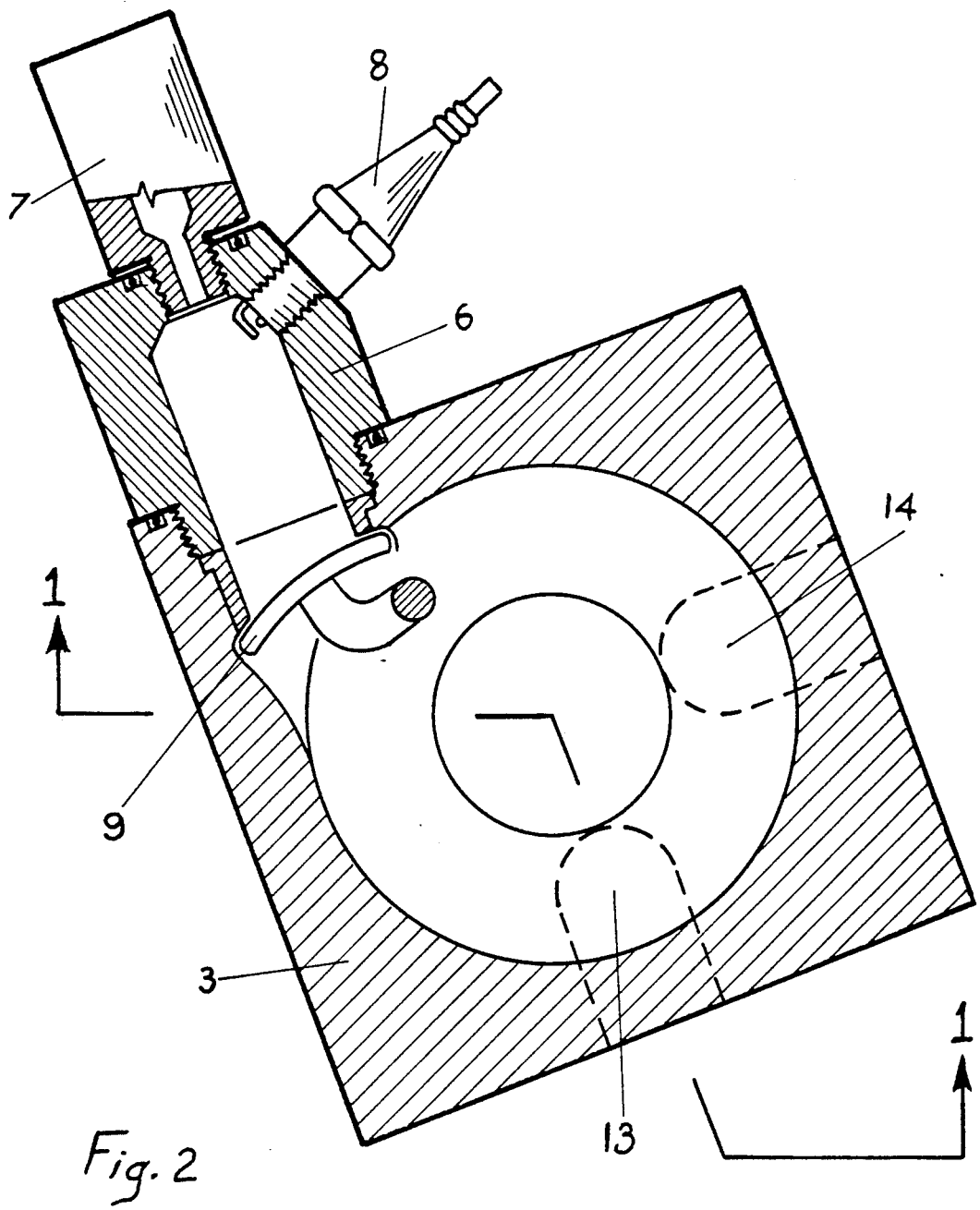
FIG. 2 is a top view of the cylinder. It shows the combustion chamber entering tangentially into the donut shaped cavity

In FIG. 1 is shown a section of the piston/cylinder arrangement used by the Isolated Combustion And Dilute Expansion (ICADE) Piston Engine. This ICADE engine improvement is applicable to all spark ignition and compression ignition engines of either two or four cycle designs. The connecting rod (1) and crankshaft are conventional but with a long stroke to piston diameter ratio in order to get a high compression ration. Two major modifications are in the piston (2) and cylinder head (3), both are cupped so that together they form a donut shaped cavity (4), with the piston at top dead center. The cupped section of the piston must extend beyond the cylinder (5) to make from for the cut-out required by the tangential entry for the products of combustion which come from a separate combustion chamber (6). This chamber is placed in line with the tangential entry as clearly shown in the top view of FIG. 2. At the far end of the combustion chamber is a fuel valve (7), which during the compression stroke, provides direct fuel injection, with or without atomization air, into the combustion chamber. Ignition timing is not controlled by the fuel injection process as it is in the Diesel cycle. When the piston nears top dead center, ignition is provided by either a spark plug (8), or by compression ignition following rapid opening of valve (9), which isolates the combustion chamber from the cylinder during the compression stroke. Valve (9) has a controlled leakage rate which, during the compression stroke, keeps the pressure inside the cylinder higher than in the combustion chamber. This pressure differential prevents fuel from escaping into the cylinder and permits compression ignition upon rapid opening of valve (9). Valve (9) is shown as a gate valve but could also be a pull-to-open valve, as long as the valve is fully out of the way into recess cavity (10) during the remainder of the cycle. The valve support arm (11) is spring loaded in such a way that spring (12) tries to keep the valve open and also function as a torsion spring to keep the valve seated. The valve seating force is augmented by the pressure differential across the valve. Following ignition the combustion chamber pressure must increase beyond that in the cylinder. At ignition, the valve (9) must be open, so as not to obstruct the flow of the products of combustion into the donut shaped cavity where they form a vortex, mix with the compressed air and are quenched prior to piston expansion. The dilution to a very lean overall air/fuel mixture reduces the temperature inside the cylinder, the formation of $NO_x$ and cylinder wear. To prevent damage to valve (9) by excessive pressure force, in the case of pre-ignition with the valve still closed, the valve is capable of pivoting out of the way, against the action of the torsion spring (12). The inlet and outlet valves (13) and (14) are conventional. Inlet valve (13) is placed in line with the combustion chamber outlet, with its inlet port opposing the combustion chamber in order to minimize scavenging. The exhaust valve (14) port is directed so as to take advantage of the vortex momentum inside the cylinder for minimum pressure loss exhaust.

Figure 3:
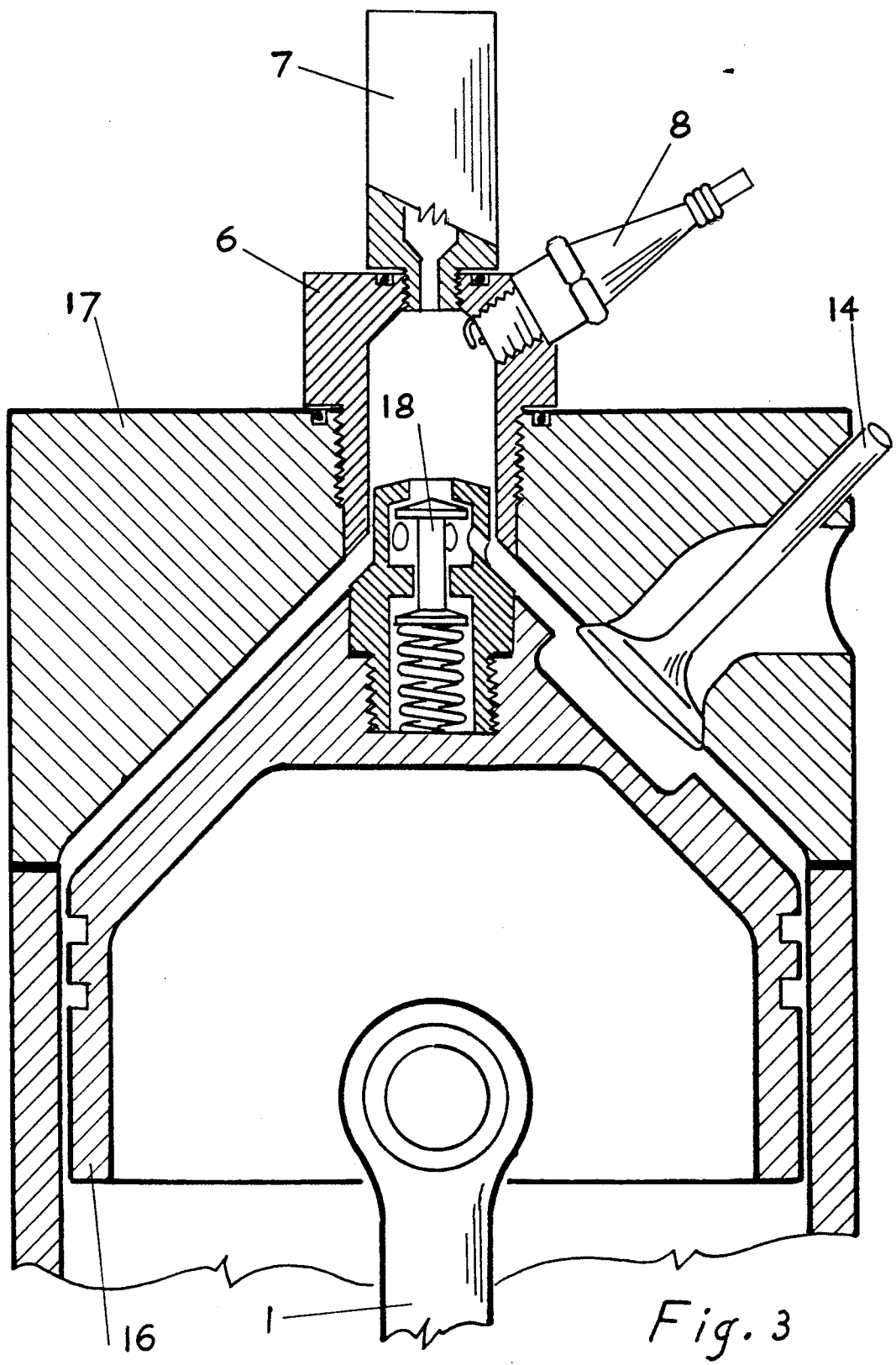
FIG. 3 is a cross-section of another ICADE Piston Engine configuration. It uses a conical piston for radial diffusion, mixing and dilution instead of a donut shaped cavity as in FIG. 1

In FIG. 3 is shown an alternate configuration for the ICADE Piston Engine. Here the piston (16) is conical and at top dead center, makes a close fit in the cylinder heat (17). The conical point of the piston contains a spring loaded pull to open type valve (18) which functions as the combustion chamber (6) isolation valve just like valve (9) shown in FIG. 1. The separate combustion chamber is mounted on top of the cylinder head and in line with the piston centerline. Some of the high dynamic pressure of the combustion products is recovered during a source flow like diffusion after they are deflected radially out by the conical tip of the piston.

We claim:

1. An internal combustion engine comprising a piston/cylinder arrangement used primarily for mechanical compression and expansion, a separate combustion chamber which is isolated from the piston/cylinder only during the compression stroke, a valve means with controllable leakage rate for providing said isolation, wherein during the compression stroke said valve means is closed sufficiently to control the pressure drop from the cylinder to the combustion chamber to prevent fuel from leaking into the cylinder and to generate a high velocity of air entering the combustion chamber to promote mixing with the fuel which is directly injected into the combustion chamber and to permit using a higher cylinder compression ratio than normally allowed for the fuel octane level without causing pre-ignition of the fuel inside the lower pressure combustion chamber.

2. The engine of claim 1 wherein said valve means is at least one of a mechanical gate-valve and a pull-to-open valve with controlled leakage, wherein when said valve is open, it provides an unobstructed passage between the piston cylinder and the combustion chamber, said valve means being open during the power stroke, the scavenging stroke and the air inlet stroke, said valve means when closed controlling the amount of leakage and thus the pressure differential between the combustion chamber and the cylinder during the compression stroke, said valve means opening at a rate adapted for at least one of spark ignition and one of compression ignition.

3. The engine of claim 1 wherein said valve means includes torsion spring surface loading means to provide a seal against cylinder pressure, but allows seal to break in case of pre-ignition prior to normal valve opening.

4. The engine of claim 1 further including fuel injection means for injecting fuel in said chamber, the isolation provided by said valve means thereby permitting early fuel injection allowing time for mixing and fuel vaporization at near stoichiometric mixture ratio for rapid combustion, said valve means adapted to adjust power level at idle by varying leakage and thereby air quantity in the combustion chamber, said separate combustion chamber adapted for rapid burning and very lean overall engine air/fuel ratio while expanding a diluted cooler mixture into the cylinder.

5. The engine of claim 1 wherein said combustion chamber is located on the longitudinal axis of the piston, said piston has a conical tip, the conical tip forming the valve means when the piston is at top dead center whereby when the combustion products exhaust from the chamber they are deflected by the conical piston surface to produce rapid mixing with the compressed air inside the cylinder and the combustion peak impacts only on the small conical tip area, thereby reducing forces acting on the piston.

6. An internal combustion engine, comprising a piston/cylinder arrangement used principally for mechanical compression and expansion, a cylinder head, a separate combustion chamber, a donut shaped cavity formed by the piston and cylinder head when the piton is at top dead center, said separate combustion chamber exhausting product of combustion tangentially into said donut shaped cavity to form a strong vortex which enhances rapid mixing, rapid cooling to quench $NO_x$ forming reactions and to temporarily store the kinetic energy of the combustion products to limit the combustion pressure peak acting on the piston surface.

7. The engine of claim 6 wherein the combustion chamber means is adapted for detonation combustion with its higher combustion pressure without creating knock by directing the combustion products from said chamber tangential to said donut and parallel to the piston surface to temporarily store the high kinetic energy of the combustion products and partially recover its dynamic pressure during expansion.

* * * * *